(12) United States Patent
Xu et al.

(10) Patent No.: US 8,260,117 B1
(45) Date of Patent: Sep. 4, 2012

(54) AUTOMATICALLY RECOMMENDING CONTENT

(75) Inventors: Zhichen Xu, San Jose, CA (US); Sami Abu-El-Haija, Mountain View, CA (US); Lei Huang, Cupertino, CA (US); Nimrod Hoofien, Palo Alto, CA (US)

(73) Assignee: Ooyala, Inc., Mountain View, CA (US)

( * ) Notice: Subject to any disclaimer, the term of this patent is extended or adjusted under 35 U.S.C. 154(b) by 0 days.

(21) Appl. No.: 13/401,098

(22) Filed: Feb. 21, 2012

Related U.S. Application Data

(63) Continuation-in-part of application No. 13/190,714, filed on Jul. 26, 2011.

(51) Int. Cl.
*H04N 9/80* (2006.01)
(52) U.S. Cl. ......... 386/262; 386/239; 386/240; 386/343
(58) Field of Classification Search .................. 386/239, 386/240, 262, 343
See application file for complete search history.

(56) References Cited

U.S. PATENT DOCUMENTS

| | | | |
|---|---|---|---|
| 6,847,778 B1 * | 1/2005 | Vallone et al. | 386/344 |
| 6,850,691 B1 * | 2/2005 | Stam et al. | 386/350 |
| 6,873,982 B1 * | 3/2005 | Bates et al. | 707/737 |
| 7,493,015 B1 * | 2/2009 | Van Stam et al. | 386/343 |
| 2004/0093601 A1 * | 5/2004 | Master et al. | 718/102 |

* cited by examiner

*Primary Examiner* — Jamie Atala
(74) *Attorney, Agent, or Firm* — Hickman Palermo Truong Becker Bingham Wong LLP

(57) ABSTRACT

Techniques are provided for selecting which videos to recommend to users by predicting the degree to which recommending each video will satisfy certain goals. To make the predictions, a trained machine learning engine is fed both collaborative filtering parameter values and content-based filtering parameter values. In the case of video-to-video recommendations, the collaborative filtering parameter values may be based on a video pair that includes a video in which a user has already demonstrated an interest. The machine learning engine generates a machine-learning score for each video. The machine learning scores are used as the basis for selecting which videos to recommend to a particular user.

24 Claims, 5 Drawing Sheets

AUTOMATICALLY RECOMMENDING CONTENT

CROSS-REFERENCE TO RELATED APPLICATIONS; BENEFIT CLAIM

This application claims the benefit as a Continuation-in-part of application Ser. No. 13/190,714, filed Jul. 26, 2011 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to automated recommendations and, more specifically, to a system for automatically recommending content to users.

BACKGROUND

It has become increasingly common for content, such as video assets, to be delivered to users over a network. Movies, television shows, home videos, how-to videos, and music videos are merely a few examples of the types of video assets that are currently provided over the Internet, telephone networks, intranets, cable connections, etc. Video assets that are obtained over a network can be played after the entire video assets have been downloaded, or as the video assets are being delivered (streamed).

Given the plethora of video assets that are available for consumption, it has become increasingly important to help users identify those video assets that are most likely to interest them. For example, a user will have a much better experience with a system that recommends to the user ten videos in which the user is highly interested, than with a system that merely provides tools for searching for those same ten videos among a million less interesting videos.

Various approaches have been used to recommend video assets to users, each of which has certain drawbacks. For example, one "trending" approach is to keep track of which video assets are most consumed by the user population as a whole, and to recommend those most-consumed video assets to all users. Another trending approach is to keep track of which videos are currently experiencing a surge of interest among the entire user population, and to recommend those videos to all users. These "one-shoe-fits-all" trending approaches work well for users that have interests that correspond to the average user, but not for all users.

A "video-to-video" approach is to recommend, to each user, video assets that have something in common with a video asset that has just been consumed by that user. For example, after a user has consumed a movie X, the user may be presented with recommendations for movies that are in the same genre as movie X, have the same main actors as movie X, have the same director as movie X, come from the same time period as movie X, etc. The video-to-video approach works well when the user has a narrow range of interests, but does not work so well when the user's appetite for a particular type of video has become satiated and the user now wants to consume something different.

A "user-to-video" approach for recommending video assets involves monitoring the asset consumption behavior of users over time. Based on a user's history of video consumption, the general interests of the user may be derived. Those derived interests may then be used to identify other videos in which the user may be interested, which may be offered as recommendations. The user-to-video approach works well as long as the user's consumption history accurately reflects the user's current interests. However, if the user has insufficient history, or the user is currently interested in something different than what the user has consumed in the past, user-to-video based recommendations are not particularly helpful.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
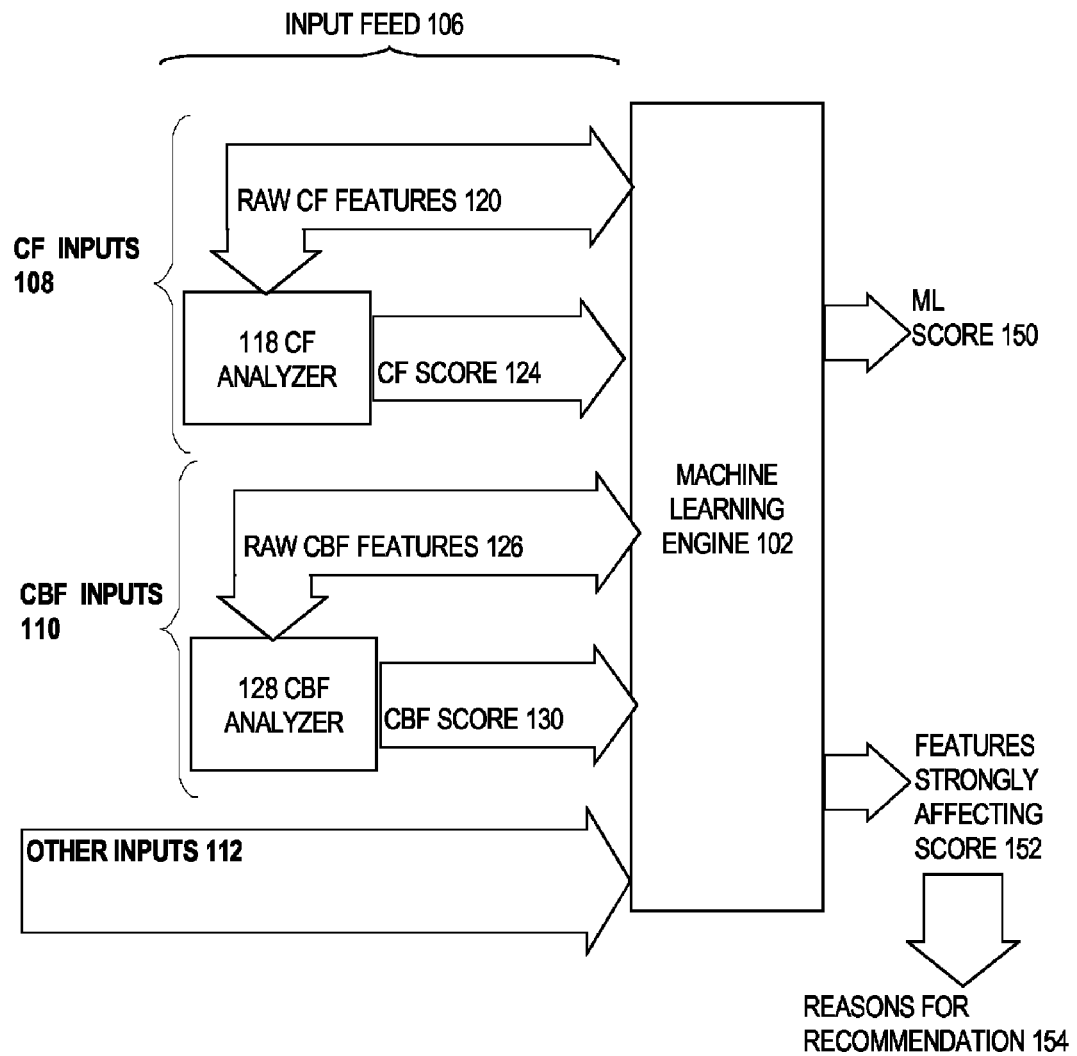
FIG. 1 is a block diagram that illustrates how a machine learning engine may be used to predict interest scores for videos, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for recommending video assets to users by predicting, for each candidate video, the degree to which recommending the candidate video to a user would satisfy a goal. In the case where the goal is user engagement, the predictions may indicate the degree to which a user would be interested in the candidate video. According to one aspect of the invention, a trained machine learning engine is fed both collaborative filtering (CF) parameter values and content-based filtering (CBF) parameter values. Based on the input parameter values, the machine learning engine generates a machine-learning score (an "ML score") that reflects the extent to which recommending the particular video to the user will satisfy a particular goal. In the case where the goal is to satisfy the viewing interests of the user, the ML score is a prediction of how interested the particular user would be in viewing the video.

For the purpose of explanation, the user for whom an ML score is generated is referred to herein as the "target user", and the video for which the ML score is generated is referred to herein as the "target video". In one embodiment, the ML score that is generated for each video in a set of candidate videos is used as a basis for selecting which videos, from among the candidate videos, to recommended to the target user.

When generating ML scores, the degree to which each input parameter affects the ML score may vary. For example, a video that was recently added to a collection may not have a significant amount of consumption history. Therefore, the parameters related to consumption history may have less effect on the ML score than the features of the video itself (e.g. length, genre, tags). On the other hand, for a video that has a long consumption history, the parameters related to consumption history may have a more significant effect on the ML score. In one embodiment, the machine learning engine generates, along with a ML score, an indication of which features had the greatest positive effect on the ML score. Based on this information, with each video recommendation, users may be provided an explanation of why that particular video is being recommended to them.

Video-to-Video Recommendations

Video-to-video recommendations refer to video recommendations that are based on a user's indication of interest in a particular video. For example, if a user has watched, browsed to, or highly rated a particular video, it may be assumed that particular video is of interest to the user. Based on that interest, a recommendation system may recommend other videos to the user. For the purpose of explanation, the video in which the user has indicated an interest is referred to herein as the "compared" video.

Using Machine Learning to Combine Collaborative Filtering with Content-Based Filtering Referring to FIG. 1, it illustrates a system for using a trained machine learning engine 102 to generate ML scores 150 for candidate video assets. The machine learning engine 102 generates the ML scores 150 based on a input feed 106 that is specific to a particular user/video combination. The input feed 106 includes several types of input parameters. In the illustrated embodiment, the input feed 106 includes collaborative filtering (CF) inputs 108, content-based filtering (CBF) inputs 110, as well as other inputs 112. Each of these inputs shall be described in greater detail hereafter.

Collaborative Filtering (CF) Inputs

Collaborative filtering inputs 108 are any inputs that relate to user opinions or behavior. Collaborative filtering is based on the assumption that two people that have similar opinions about one thing are likely to have similar opinions about another thing. In the context of predicting user interest in video assets, collaborative filtering assumes that if a target user has enjoyed viewing several of the same videos as another user, then the target user is likely to enjoy viewing a video that the other user enjoyed, but that the target user has not yet seen.

Information about the opinions of users may be obtained or derived in a variety of ways. For example, the types of videos a user is interested in is implicitly reflected in the user's video viewing history. Thus, collaborative filtering inputs 108 may include data about the video viewing history of the target user, the viewing history of users that are similar to the target user, and/or the viewing history of the entire population of viewers.

Collaborative filtering inputs 108 may also include demographic information, based on the assumption that users with similar demographic characteristics will have similar video viewing interests. Such demographic information may include, for example, the age, gender, geographic location, income bracket, etc. of users. The collaborative filtering inputs 108 may also include interests that users have explicitly identified by, for example, filling out a video preference survey or rating previously-viewed videos.

In the context of video-to-video recommendations, the CF inputs 108 may specifically indicate user behavior as it relates to the compared video/target video pair (the "video pair"). Examples of various types of CF metrics that may be maintained for a video pair are described hereafter in detail.

In the embodiment illustrated in FIG. 1, machine learning engine 102 is fed both raw CF features 120 and a CF score 124 produced by a CF analyzer 118 based on the raw CF features. The CF score is a prediction, by the CF analyzer 118 that implements an collaboration filtering algorithm, of the degree to which providing the target video to the target user will satisfy a goal. For the purpose of explanation, it shall be assumed that the goal is satisfying the viewing interest of the target viewer. However, as shall be described in greater detail hereafter, the target goal may something other than satisfying the interest of the viewer, or may be a combination of satisfying the viewer's interest and one or more other goals.

As is evident by FIG. 1, rather than simply use the CF score 124 as the prediction of the target user's interest in the target video, the CF score 124 is simply one of the several inputs that is fed into the machine learning engine 102 to generate the ML score 150. Ultimately, the machine learning engine 102 determines how heavily the CF score 124 should be weighted in generating the ML score 150, which is used as the basis for selecting which videos to recommend.

Content-Based Filtering (CBF) Inputs

Content-based filtering inputs 110 are any inputs that relate to how similar the content of the target video is to the content of other videos. For the purpose of explanation, an embodiment shall be described in which video-to-video recommendations are generated. Thus, the content-based filtering inputs focus on the similarity between a video pair comprising the target video and the compared video. However, in alternative embodiments, the content-based filtering inputs 110 may include feature information for any number of other videos, such as the set of videos that the target user has recently viewed, browsed, or rated.

As mentioned above, the compared video is typically a video in which the target user has already indicated an interest. For example, the compared video may be a video that the target user has recently viewed, or to which the target user has recently given a high rating.

Similar to the collaboration filter inputs 108, the content-based inputs 110 also include a score that is derived from the raw inputs. Specifically, the content-based filtering inputs 110 include raw CBF features 126, and a CBF score 130 that is generated by a CBF analyzer 128 based on the raw CBF features 126. The raw CBF features 126 may include any number of features related to the target video and the compared video. For example, the raw CBF features 126 may include features, such as title, genre, duration, actors, keywords, tags, etc.

The CBF score 130 is an estimate of how similar the target video is to the compared video. Presumably, the higher the CBF score 130, the greater the similarity between the target video and the compared video. While some systems use CBF scores as the sole basis for selecting videos to recommend, in the embodiment illustrated in FIG. 1, CBF score 130 is merely one of the many input parameters fed to the machine learning engine 102. The actual weight given to the CBF score 130 in deriving the ML score 150 will vary based on the other inputs to the machine learning engine 102, and the training set by with which the machine learning engine 102 was trained.

Other Inputs to the Machine Learning Engine

There is virtually no limit to the type and nature of other inputs 112 that may be fed to the machine learning engine 102 to increase the accuracy of the ML scores 150. For example, the other inputs may include the time of day at which the recommendation is to be given, the day of week at which the recommendation is to be given, the connection speed of the target user, etc.

The Machine Learning (ML) Scores

Based on the collaborative filtering inputs 108, the content-based filtering inputs 110, and any number of other inputs 112, the machine learning engine 102 generates a ML score 150. The value of the ML score 150 is a prediction of how well providing the target video to the target user will satisfy a particular goal or set of goals. In an embodiment where the goal is user engagement, the ML score 150 is a predication of how much interest the target user will have in viewing the target video.

The process of generating a ML score is repeated for each video in a set of candidate videos. Based on their respective ML scores, the candidate videos in which the target user is likely to have the most interest are selected to be presented to the target user as recommended videos.

By combining collaborative filtering (CF) with content-based filtering (CBF) in the manner illustrated in FIG. 1, the strengths of each technology can be enjoyed. In particular, the judgments generated CF/CBF analyzers are exposed, together with the raw features from the CF/CBF, directly to the machine learning engine 102. Giving the machine-learning engine 102 access to the raw features may provide several benefits.

First, providing the raw features to the ML system, along with the CF/CBF scores, allows the ML system to combine the scores based on the signal strength from CF and CBF, respectively. That is, the relative weights given to the CF/CBF scores will vary from iteration to iteration based on the other inputs fed to the ML system. For example, for new movies which do not have enough behavior data, the signal strength of CF is weak. Therefore, the ML system will give less weight to the CF score when generating the ML score. Consequently, the content-based features are emphasized in the ML score. As the video is viewed by more people, the behavior data will increase, as will the weight given to the CF score by the ML system when generating the ML score.

Second, exposing raw CBF features allows the ML system to effectively address the new content problem based on the historical CF and CBF learnings in their entirety. For example, the ML system can learn that videos that share keyword such as 'a', 'the' are not necessarily related, whereas other shared keywords such as 'football', '49ers', may indicate stronger relation. Consequently, CBF scores that are high because of weak non-specific words will be given less weight by the machine learning engine 102 when generating ML scores, while CBF scores that are high because of highly-specific words will be given more weight by the ML system when generating ML scores.

Explainable Recommendations

According to one embodiment, in addition to presenting a target user with a set of one or more recommended videos, the recommendation system also presents that user with information about why each of the videos is being recommended. Specifically, in one embodiment, machine learning engine 102 provides output 152 that indicates the features that most positively affected each ML score 150. For example, the output 152 may indicate that the target video received a high ML score 150 because the CF score 124 was high and, based on the other inputs, the CF score 124 was heavily weighted in the generation of the ML score 150. On the other hand, the output 152 for a target video may indicate that the CBF score was high and, based on the other inputs, the CBF score was heavily weighted in the generation of the ML score 150. These are merely two examples of the types of features that can have a strong positive effect on the ML scores of videos.

Based on the features that most positively affected the ML score 150, indicated by output 152, the recommendation system may select a "explanation" for why the corresponding video was recommended to the target user (i.e. why the ML score 150 was sufficiently high to justify recommending the target video). For example:

If the CBF score 130 is high, and was heavily weighted by the machine learning engine 102, then the user may be presented with the explanation "This video is similar to X" (where X is the compared video).

If the CF score 124 is high, and was heavily weighted by the machine learning engine 102, then the user may be presented with the explanation "Viewers of X frequently view this video" (where X is the compared video).

If the other inputs 112 indicate that the target video is one of the most viewed videos among the entire population of viewers, and this feature had a significant effect on the ML score 150, then the user may be presented with the explanation: "This video is one of the most viewed videos among all users".

If the other inputs 112 indicate that the target video is currently experience an interest boost, and this feature had a significant effect on the ML score 150, then the user may be presented with the explanation "This video is currently experiencing a significant interest burst".

These are merely examples of the virtually unlimited number of explanations that a user may be presented to explain to the user why the target video is being recommended. While these examples are very general, actual explanations may be very specific. For example, in addition to indicating that "this video is similar to X", the explanation may enumerate the various aspects of the video that are similar to X (e.g. genre, actors, theme, tags, duration, music score, etc.)

Metrics for the Recommendation System

As mentioned above, collaborative filtering inputs 108 may include information about the viewing behavior of video consumers. The viewing behavior is reflected in the raw CF features 120 that are fed to both the CF analyzer 118 and the machine learning engine 102. To obtain the CF features, the recommendation system may process user-centric metrics from player logs (with rich behavior information) to ultimately produce video-pair-centric metrics that are included in the input feed 106 to the machine learning engine 102.

Figure 2:
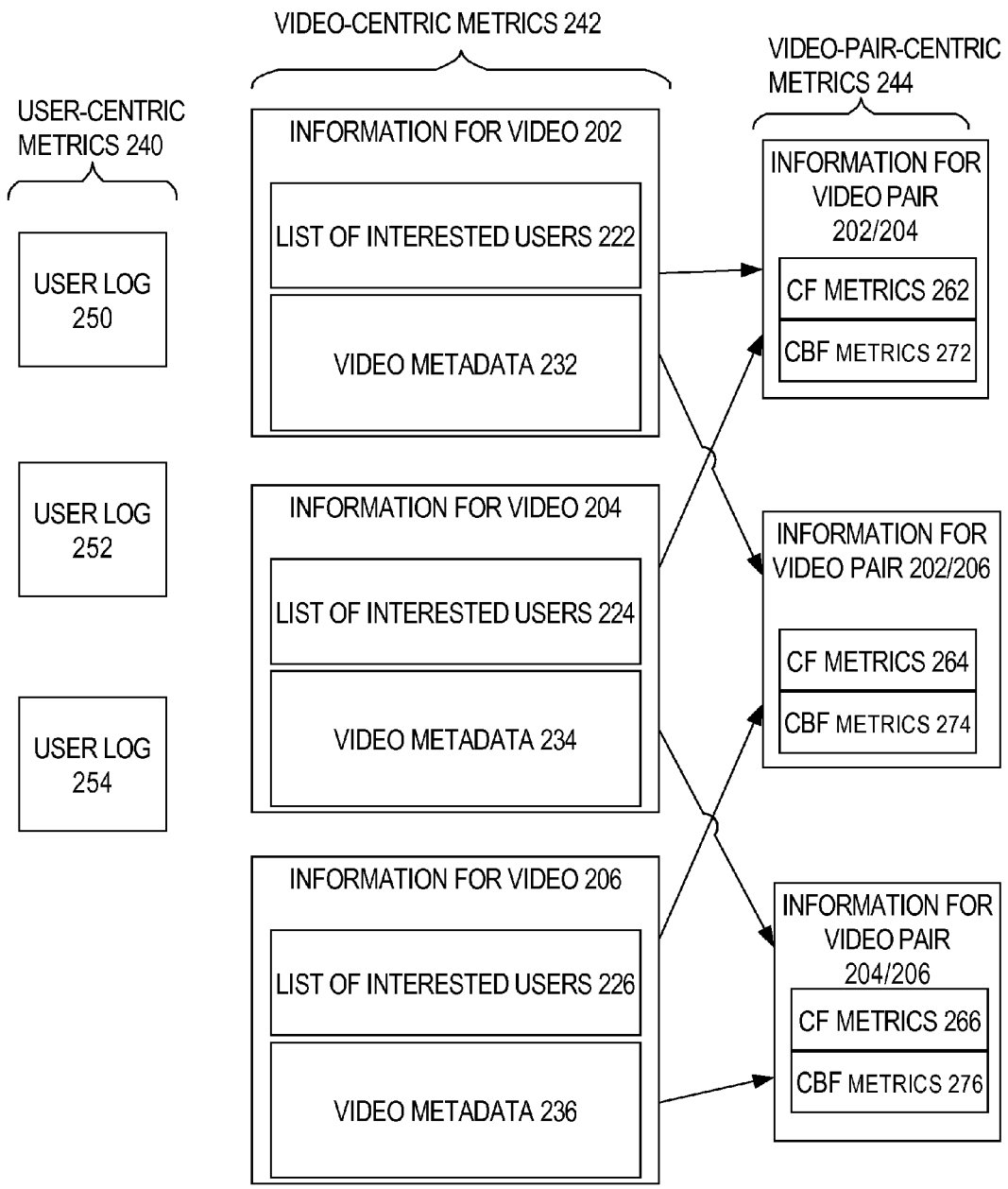
FIG. 2 is a block diagram that illustrates various types of metadata that may be maintained by a recommendation system, according to an embodiment of the invention.

Referring to FIG. 2, it is a block diagram that illustrates the various types of metrics that may be maintained by a recommendation system, according to an embodiment of the invention. The metrics may include user-centric metrics 240, video-centric metrics 242, and video-pair-centric metrics 244.

User-Centric Metrics

With respect to user-centric metrics 240, the recommendation system maintains a user log for each user. The user log of a user indicates which videos the user has viewed or otherwise expressed an interest in. FIG. 2 illustrates three user logs 250, 252 and 254.

According to one embodiment, in addition to listing the videos in which a user has expressed an interest, the user logs also indicate the amount of interest that was indicated by the user's action, and a timestamp that indicates when the interest was expressed. According to one embodiment, the amount of interest that a user expresses in a video is represented by an "intensity" value that is stored along with the video listing within the user log.

The intensity value may be determined by a variety of factors, such as the type of interaction the user had with the video. For example, a user that viewed a video expresses more interest in the video than a user that merely browses the video. Within each type of interaction, the intensity value may be affected by other factors. For example, a user that gives a video a five star rating has a more intense interest in the video than a user that gives the video a three star rating. As another example, a user that views an entire video has a more intense interest than a user that merely watches the first half of the video. Thus, "percentage of video viewed" may be a factor in determining a user's intensity of interest. As yet another example, a user that watches a video repeatedly has a more intense interest than a user that watches the video once.

Video-Centric Metrics

The recommendation system processes the user logs, and makes corresponding updates to the video-centric metrics 242 maintained for each video. In the embodiment illustrated in FIG. 2, the recommendation system maintains information for each of three videos 202, 204 and 206. For each video, the information maintained by the recommendation system includes a list of the users that have expressed an interest in the video. The "interested user lists" of videos 202, 204 and 206 are illustrated as lists 222, 224 and 226, respectively. In one embodiment, these lists include entries, each of which identifies a user, a timestamp, and an intensity value that indicates how intensely the user expressed an interest in the video at the time indicated by the timestamp.

In addition to interested user lists 222, 224 and 226, video metadata is maintained for each of the videos. The video metadata maintained for each video may include any number and type of information about the video, such as duration, creation date, tags, title, keywords, language, etc. Frequently, the initial video metadata for a given video is provided by the producer of the video (e.g. title, actors, language) or derivable from the video itself (e.g. duration, encoding format). However, in some publishing environments, the metadata for the video may be changed or augmented over time. For example, user tags may be added to the video as more users view the video. As another example, the number of views and the rating of the video may be continuously changing as users view and rate the video. In the embodiment illustrated in FIG. 2, the video metadata for videos 202, 204 and 206 is illustrated as video metadata 232, 234 and 236, respectively.

Video-Pair-Centric Metrics

Video-pair-centric metrics 244 are metrics that relate to a pair of videos. For example, FIG. 2 illustrates metrics for the pair of videos 202 and 204, metrics for the pair of videos 202 and 206, and metrics for the pair of videos 204 and 206. In the embodiment illustrated in FIG. 2, for each video pair, the metrics include CF metrics and CBF metrics.

In general, the CF metrics for a video pair are metrics for predicting the likelihood that users that watch one video in the pair will also watch the other video in the pair. Thus, CF metrics 262 are metrics for predicting the likelihood that users that watch one of video 202 and 204 will watch the other of video 202 and 204. Similarly, CF metrics 264 are metrics for predicting the likelihood that users that watch one of video 202 and 206 will watch the other of video 202 and 206. Finally, CF metrics 266 are metrics for predicting the likelihood that users that watch one of video 204 and 206 will watch the other of video 204 and 206.

In one embodiment, the CF metrics for each video pair includes at least:
  Total time spent by all users on each video in the video pair
  The sum of minimal time spent by individual users on the video pair
  For users that watched both videos in the pair, how much time elapsed between watching the two videos
  The distribution of the users (distinguishes between the video being watched 100 times by one person, and the video being watched once by each of 100 different people)
  The distribution of the videos watched by each user who watched the video pair (indicates whether users that watch this video tend to watch a many videos, or few videos)
  How "discoverable" each video in the pair is relative to the other video (e.g. distinguishes between, for example, videos that frequently appear on the same page or listing, and videos that rarely appear on the same page or listing).

The CF metrics for a video pair may be derived from the interested user lists that are maintained for each video in the pair. For example, the total time spent by all users on each video in the 202/204 video pair may be determined based on the information in lists 222 and 224. Similarly, CF metrics 264 may be derived from lists 222 and 226. Likewise, CF metrics 266 may be derived from lists 224 and 226.

When one of the videos in a video pair is the target video, and the other video in the video pair is the compared video, the CF metrics for the video pair may be included in the raw CF features 120 used to generate an ML score. Specifically, to determine the degree to which recommending a video X to a particular user will achieve a goal, where the particular user has demonstrated an interest in video Y, the CF metrics for the video X/Y pair may be fed to both the CF analyzer 118 and the machine learning engine 102. The CF analyzer 118 would produce a CF score 124 based on those CF metrics. The CF score 124 would be fed to the machine learning engine 102, and the machine learning engine 102 would determine how much weight to give the CF score 124 based, at least in part, on those CF metrics.

In addition to the CF metrics, the video-pair-centric metrics for each video pair include CBF metrics. The CBF metrics of a video pair are metrics that generally indicate how similar the content of the videos in the video pair are. For example, the CBF metrics of a video pair may indicate how many tags the videos have in common, which metadata (e.g. actors, directors, keywords) the videos have in common, etc. In the embodiment illustrated in FIG. 2, the CBF metadata for the video pairs 202/204, 202/206 and 204/206 are respectively shown as CBF metrics 272, 274 and 276.

According to one embodiment, when one of the videos in a video pair is the target video, and the other video in the video pair is the compared video, the CBF metrics for the video pair may be included in the raw CBF features 126 used to generate an ML score. Specifically, to determine the degree to which a video X is similar to a video Y in which a user has expressed an interest, the CBF metrics for the video X/Y pair may be fed to both the CBF analyzer 128 and the machine learning engine 102. The CBF analyzer 128 would produce a CBF score 130 based on those CBF metrics. The CBF score 130 would be fed to the machine learning engine 102, and the machine learning engine 102 would determine how much weight to give the CBF score 130 based, at least in part, on those CBF metrics.

Incremental Updates of Behavior Data

For the ML score 150 to be as accurate as possible, the raw CF features 120 that are used to generate the ML score 150 should be as current as possible. However, the larger the video viewing population, the more difficult it is to ensure that the raw CF features 120 for all candidate videos is kept up to date.

For example, assume that a video collection has a million video assets, and that at any given time, tens of thousands of viewers are viewing videos. Under these conditions, the amount of viewing behavior information would be enormous. One approach to updating the behavior data would be to collect the user-centric metrics in real-time and, at the end of each week, perform a batch update to the video-centric metrics 242, and then to the video-pair-centric metrics 244. However, such an approach would result in the use of relatively stale video-centric metrics 242 and video-pair-centric metrics 244 by the recommendation system.

To avoid the use of stale video-centric metrics 242 and video-pair-centric metrics 244 by the recommendation system, techniques are provided for incrementally maintaining the video-centric metrics 242 and the video-pair-centric metrics. According to one embodiment, the recommendation system incrementally folds new user behavior data into a user history that summarizes all historical watching behavior in the form of a (user, video, intensity) tuple. In addition, the recommendation system distinguishes new information from old information, and only updates the video-pair-centric metrics 244 of video pairs that have new user activities.

Specifically, in one embodiment, the video-centric CF metrics for a particular video are only updated in response to an new expression of interest in the particular video. Similarly, the video-pair-centric metrics for a particular video pair are only updated in response to a new expression of interest in at least one of the videos that belong to the video pair. Because many videos may experience long periods during which no user expresses an interest, the percentage of video-centric metrics that need to recalculated is reduced, thereby lowering the processing required to maintain the video-centric metrics 242 and video-pair-centric metrics 244 up to date in real time.

Incremental Updates of Video Metadata

Similar to CF metrics, it is important for the CBF metrics of each video, and of video pair, to be maintained up-to-date, since these metrics have an effect on the ML scores that are used as the basis for selecting videos to recommend. To maintain the CBF metrics up-to-date in an efficient manner, the content-based pipeline used by the recommendation system is also maintained incrementally. For example, in one embodiment, as soon as new videos get ingested into the recommendation system and metadata about a video becomes available, the video becomes recommendable immediately.

In one embodiment, the content-based pipeline is implemented such that new videos are compared to new videos and existing videos only when they share common metadata. In one embodiment, the recommendation maintains a (feature name, feature value) to (timestamp, video, video metadata) mapping. In such an embodiment, the content-based pipeline may include the following logical steps:

Generate (feature name, feature value) to (timestamp, video, video metadata) mapping, and fold the new video into global table Group videos that contain the same (feature name, feature value)

For each group, generate video pairs.

Aggregate the video pairs. For each pair, compute pairwise distance.

This pairwise distance may be the CBF score that is fed to the machine learning engine 102 when one of the videos in the video pair is the target video and the other video in the video pair is the compared video. For performance reasons, the recommendation system may look at the timestamps, and only compare new videos with new videos, and new videos with old videos (but not old videos with old videos).

In one embodiment, the raw CBF features 126 that are fed to machine learning engine 102 for a target video reflect the current video-centric metrics 242 for that target video, and the current CBF metrics for the video pair comprising that video and the compared video. This is particularly important in environments where the video metadata associated with any given video can change significantly over time (e.g. as new tags are added to video).

As mentioned above, in one embodiment, the CBF metrics for a video pair are created when the second video in the pair is added to the collection, and are only updated in response to a change in the video metadata of either of the videos in the video pair. For example, assume that video 202 exists in a video collection at the time the video 204 is added to the collection. In response to the addition of video 204 to the collection, the CBF metrics 272 for the video pair 202/204 may be initially created based on the video metadata 232 for video 202 and the video metadata 234 for video 204.

Once generated, CBF metrics 272 remains unchanged until the video metadata for either video 202 or video 204 is changed. Such a change (e.g. the addition of a tag to one of the videos in the video pair) triggers the recalculation of the CBF metrics 272 for the pair. Since each video may belong to multiple video pairs, the update to the video metadata for one video may trigger the recalculation of the CBF metrics for many video pairs. For example, an update to the video metadata 232 of video 202 would trigger the recalculation of the CBF metrics 272 of video pair 202/204, and the recalculation of the CBF metrics 274 of video pair 202/206.

Precomputing Scores for Video Pairs

While not illustrated in FIG. 2, the video-pair-centric metrics 244 for each video pair may also include a pre-computed CF score and a pre-computed CBF score. Specifically, rather than generate CF and CBF scores for a the video pair at the time a video recommendation is needed, those scores may be pre-computed at the time the underlying video pair metrics are updated. Consequently, at the time a video recommendation is needed, the pre-computed scores may simply be read from storage and fed into the machine learning engine 102. There is a trade-off between doing this computation at recommendation (query) time, and movie information update time. A general guiding principle is to take advantage of their relative frequency, and how to do the computation as infrequently as possible.

For example, the CF score 124 for the video pair 202/204 is based on CF metrics 262. CF metrics 262 is updated in response to an indication of user interest in video 202 or video 204. In response to the indication of user interest, CF metrics 262 may be updated and a CF score 124 may be generated for the video pair 202/204 by feeding the updated CF metrics 262 into the CF analyzer 118. This pre-computed CF score may then simply be read, rather than recomputed, when using machine learning engine 102 to generate an ML score 150 based on the video pair 202/204.

Similarly, the CBF score 130 for the video pair 202/204 is based on CBF metrics 272. CBF metrics 272 is updated in response to an update to the video metadata for video 202 or video 204. In response to such a metadata update, CBF metrics 272 may be updated and a CBF score 130 may be generated for the video pair 202/204 by feeding the updated CBF metrics 272 into the CBF analyzer 128. This pre-computed CBF score 130 may then simply be read, rather than recomputed, when using machine learning engine 102 to generate an ML score 150 based on the video pair 202/204.

Selecting the Video Pairs for which to Maintain Metrics

Theoretically, video-pair-centric metrics 244 may be maintained for every combination of two videos in a collection. Maintaining a video-pair-centric metrics for every possible video pair in a collection would result in N×(N−1) distinct sets of video-pair-centric metrics, where N is the number of videos in the collection. While maintaining that many sets of video-pair-centric metrics is easily achieved for small collection, it becomes impractical for extremely large collections.

Therefore, according to an embodiment, a video must pass a "pairing test" with a given video before the video is deemed sufficiently similar to the given video to justify maintaining video-pair-centric-metrics for the video pair of the video and the given video. The videos that pass the pairing test relative to a particular video are referred to herein as the "paired video set" for that particular video. Thus, in one embodiment, video-pair-centric metrics 244 is maintained for any given video pair (video X/video Y) if and only if video Y is in the paired video set of video X.

The pairing test may be, for example, that the videos must share any one of the following characteristics: genre, actors, director. This is merely one example of the virtually unlimited types of pairing tests that may be applied to determine whether to maintain video-pair-centric metrics for a particular video pair. The more restrictive the pairing test, the fewer the video pairs for which video-pair-centric metrics 244 are maintained, and therefore the lower the overhead of maintaining video-pair-centric metrics 244.

However, if the pairing test is too restrictive, then the recommendation system may fail to make some recommendations that would be useful. For example, if video X is not in the paired video set of video Y, then video X is not likely to be recommended by the recommendation system when video Y is the compared video, even if most viewers of video Y would really enjoyed viewing video X.

The pairing test may be arbitrarily complex. For example, the test may have rules such as:
- If video X has a rating of N or better, then video X is automatically deemed to satisfy the pairing test relative to all videos.
- If video X has a rating that is less than N view, but more than M views, then video X is deemed to satisfy the pairing test relative to videos that have at least one of the following in common: genre, actor, director.
- If video X has less than M views, then video X is deemed to satisfy the pairing test relative to videos that are in the same genre.

In these rules, the rating of a video determines what conditions must be satisfied to pass the pairing test. However, in alternative pairing tests, the action conditions for pairing may vary based on other factors.

Rather than use a pairing test to determine whether to store any video-pair-centric-metrics for a video pair, the pairing test may be used to determine whether a particular type of video-pair-centric-metrics should be maintained for a video pair. For example, CF metrics may be maintained for all video pairs in a collection, whereas CBF metrics are only maintained for video pairs that pass the pairing test. Alternatively, CBF metrics may be maintained for all video pairs in a collection, whereas CF metrics are only maintained for video pairs that pass the pairing test.

In yet another embodiment, there may be a different pairing test for each type of video-pair-centric metrics. For example, the recommendation system may store CF metrics for a video pair if both videos in the pair have a rating that exceeds a certain threshold. At the same time, the recommendation system may store CBF metrics for a video pair if the video pairs have at least one significant feature (e.g. genre, actors, director) in common. In such an embodiment, the video-pair-centric metrics 244 for some video pairs may include both CF metrics, and CBF metrics, and for other video pairs may only have CF metrics or CBF metrics, but not both.

Video-to-Video Recommendations Based on Paired Video Sets

According to one embodiment, when giving a video-to-video recommendation, the recommendation system only generates ML scores for the videos that are in the paired video set of the video in which the user has already expressed an interest. For example, assume that a user has just finished viewing a video X. To recommend the next video for the user to watch, machine learning engine 102 is used to generate ML scores 150 for each video in the paired video set of video X.

In this example, the raw CF features 120 for each video in the paired video set of video X would include the CF metrics for the video pair that includes the video and video X. These raw CF features 120 would be fed to CF analyzer 118 to generate a CF score 124 that predicts how much interest a viewer of video X would have in viewing the target video.

Similarly, the raw CBF features 126 would include the CBF metrics for the video pair that includes the video and video X. These raw CBF features 126 would be fed to CBF analyzer 128 to generate a CBF score 128 that predicts how similar video X is to the target video.

As illustrated in FIG. 1, the raw features 120 and 126 and other inputs 112 are fed to the machine learning engine 102, along with the scores 124 and 130, to enable machine learning engine 102 to determine how much weight to give to each of the scores 124 and 130. Based on the determined weights, machine learning engine 102 generates the ML score 150 for the target video.

After repeating this process for all videos in the paired video set of video X, the ML scores generated for the videos are used as the basis for determining which of the videos to recommend.

Decay Factors

In general, a user's recent actions are more indicative of the user's current interests than actions taken by the user in the more distant past. Therefore, in generating CF score 124, CF analyzer 118 may apply a "decay" factor that adjusts the weight given to user behavior metrics based on how recently the behavior occurred.

For example, for the purposes of generating the CF score 124, the CF analyzer 118 may give data that indicates that a user viewed both videos of a video pair 100% weight immediately after the user views both videos, 80% a week later, and 60% two weeks later. The recency of user behavior may be determined by the timestamps captured in the user logs.

The higher the decay factor, the lower the weight given to older behavior. Conversely, the lower the decay factor, the higher the weight given to older behavior. An example of a high decay factor would be, for example, giving 100% weight to current behavior, 10% weight to behavior that is a week old, and no weight to behavior more than two weeks old.

Changing the decay factor used by CF analyzer 118 affects the CF score 124 produced by the CF analyzer 118. For example, assume that many users have watched a particular video pair two weeks ago, but few users have watched the same video pair in the last week. Under these conditions, use of a high decay factor would result in a low CF score 124, because little weight would be given to the older viewing information. On the other hand, use of a low decay factor would result in a high CF score 124, because the old usage information would have a significant effect on the CF score 124.

Unfortunately, there is no decay factor that yields optimal results in all situations. For example, using a high decay factor for videos from a publisher of highly-watched videos may yield CF scores 124 that accurately predict whether users that watched one video in a video pair may be interested in watching the other video in the video pair. Use of a high decay factor may be optimal for such types of videos because the quantity of recent viewing activity is sufficient to produce accurate predictions. Consequently, old behavior data can be discounted accordingly.

On the other hand, using a low decay factor may yield more accurate CF scores 124 for videos from publishers whose videos are watch much less frequently. Using a low decay factor under such circumstances may be needed to ensure that the CF score 124 is based on sufficient behavior data to be useful. Thus, in this example, an input parameter (video publisher) that is independent of the decay factor may give an indication to machine learning engine 102 which decay factor would be more appropriate to use in any given situation.

Rather than attempt to guess which decay factor would produce the most accurate CF score 124 for each video pair, an embodiment is provided in which multiple CF scores are fed into the machine learning engine 102 for each video pair, where each CF score is produced by using a different decay factor. Such an embodiment is illustrated in FIG. 3.

Figure 3:
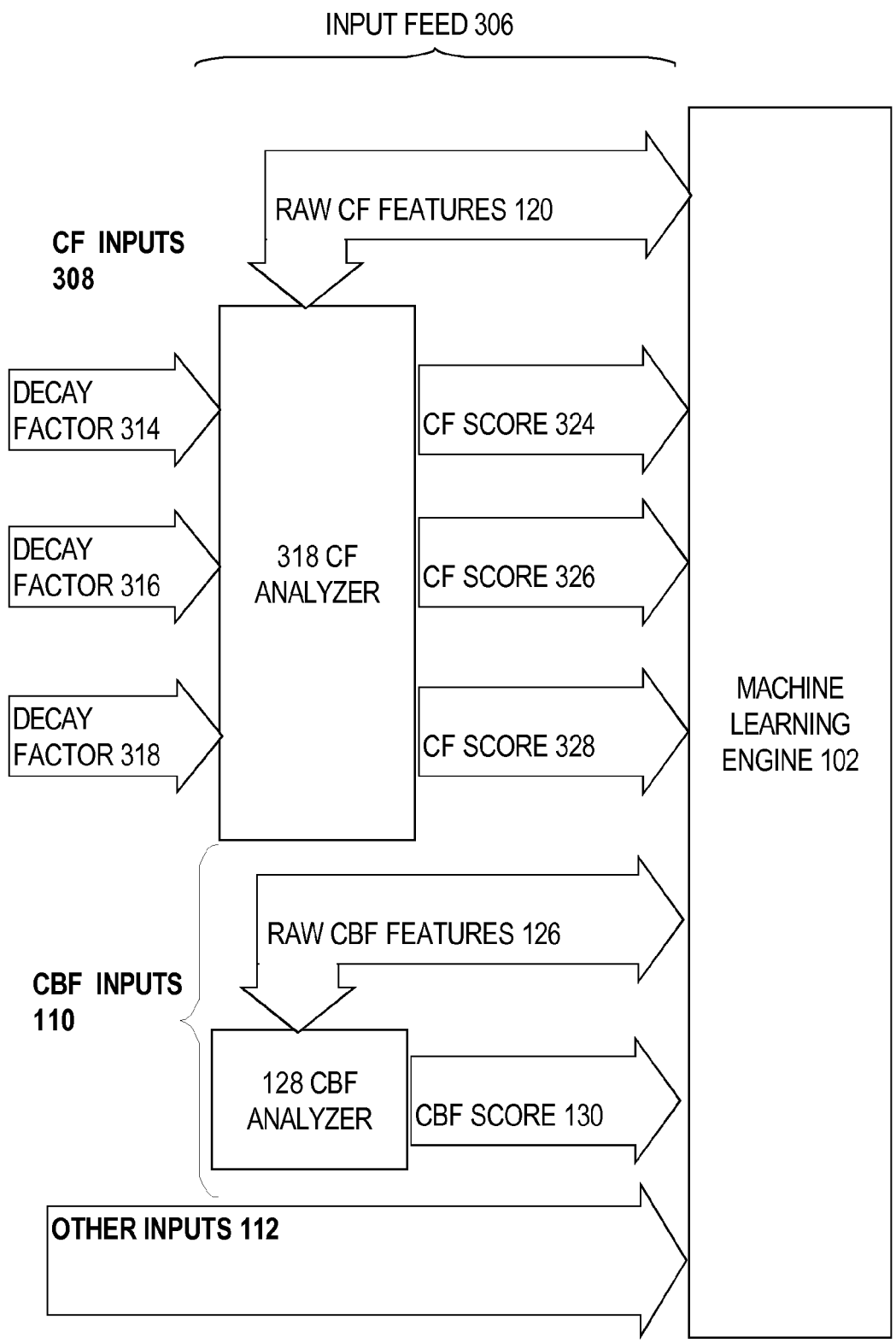
FIG. 3 is a block diagram that illustrates how multiple scores may be fed into a machine learning engine for different values of a model tuning parameter, according to an embodiment of the invention.

Referring to FIG. 3, it illustrates a recommendation system in which the machine learning engine 102 is fed CF inputs 308 that include three distinct CF scores 324, 326, 328. CF scores 324, 326 and 328 are based on the same raw CF features 120, but are produced by using three different decay factors 314, 31 and 318. Based on the other features in the input feed 306 (such as video producer), machine learning engine 102 determines which of the CF scores should have more effect on the ML score 150.

For example, if the raw CBF features 126 indicate that the videos in the video pair are about highly-viewed current news events from a particular publisher, machine learning engine 102 may give more weight to the CF score that is based on a high decay factor. On the other hand, if the raw CBF features 126 indicate that the videos in the video pair are rarely-viewed classic movies from another publisher, machine learning engine 102 may give more weight to the DV score that is based on a low decay factor.

While in the embodiment illustrated in FIG. 3 uses three different decay factors, the actual number of decay factors used may vary from implementation to implementation. For example, one embodiment may generate twenty CF scores for any given video pair, where each of the twenty CF scores is based on a different decay factor. As shall be explained in greater detail below, this technique is not limited to decay factors, and may be used with any number of other parameters as well.

Odds-Ratio Cut Off

When models are used to generate predictions, the models user certain "model tuning parameters" that are based on assumptions. The decay factor, discussed above, is an example of such a model tuning parameter. For example, a model that uses a decay factor that decreases the weight given to an action by 50% after one week assumes that a past action's ability to predict future action decreases by 50% after one week.

The decay factor is merely one example of a model tuning parameter that may be used by the models that are implemented in CF and CBF analyzers. In addition to decay factors, the models employed by CF analyzers may, for example, use a odds-ratio cut-off threshold to reduce the number of false-positives caused by highly popular videos when predicting whether two videos are actually related to each other.

An odds-ratio cut off may be used to address the problem that extremely popular videos may be watched by so many users, that the fact that those users watch some other video in addition to the extremely popular video is not an accurate indication that the other video is related to the extremely popular video. To avoid predicting that extremely popular videos are related to other videos to which they are not related, the model used by CF analyzer 118 may determine whether two videos are related by computing the odds that the two videos co-occur independently in a user's viewing log (as opposed to co-occurring dependently). If the odds that the two videos co-occur independently are greater than the odds-ratio cut off that is used by the model (e.g. 50%), then it is assumed that the two videos are not actually related to each other.

As with the decay factor, the odds-ratio cut off that is used by a model (a) affects the predictions, and (b) is based on assumptions that may not always hold true. For example, in some cases, two videos may be highly related even though the statistics indicate that there is a 55% chance that they co-occur independently in user logs. In this situation, use of a 60% odds-ratio cut off would have caused the model to predict that the videos are in fact related.

On the other hand, two videos may be unrelated even though the statistics indicate that there is only a 45% chance that they co-occur independently in user logs. In this situation, use of a 40% odds-ratio cut off would have caused the model to predict that the videos are unrelated.

Normalization Factors

A normalization factor is another example of a model tuning parameter that may be used by some models. A normalization factor generally tries to normalize scores based on users' overall viewing behavior. For example, user A and user B both watched video pair (v1, v2) for 50 minutes. However, user A only watched videos v1 and v2, whereas user B watched hundreds of other videos. User B has more divided attention relative to the video pair. The endorsement from user A for the relatedness of video v1 and v2 should be more important than that from user B. This is in the same spirit of PageRank used in Web page ranking, where the weight given to an out-going link depends in part on the number of out-going links each web page may have.

Parallel Computation Using Different Model Tuning Parameters

Because the values that models use for model tuning parameters (e.g. decay factors, normalization factors, odds-ratio cut off, etc.) are based on assumptions that do not necessarily hold true for all situations, embodiments are provided in which scores for different model tuning parameter value combinations are fed to the machine-learning engine 102 in parallel.

For example, FIG. 3 illustrates feeding to machine learning engine 102 three CF scores 324, 326 and 328 in parallel, each of which is associated with a different decay factor value. In an alternative embodiment, one CF score could be generated for each of several (decay factor, odds-ratio cut off) value combinations. For example, an embodiment may use three different values for the decay factor (X, Y, Z), and two different odds-ratio cut off thresholds (A, B). In such an embodiment, machine learning engine 102 would be fed, in parallel, six CF scores—one for each of the model tuning parameter value combinations (X, A), (X, B), (Y, A), (Y, B), (Z, A), (Z, B).

While in this example uses the model tuning parameters of decay factors and odds-ratio cut off thresholds, the same parallel-score-generation technique may be used for any type and number of model tuning parameters. For example, a particular CF analyzer may use a model that employs four different model tuning parameters. For each model tuning parameter, there may be three viable values to test. In such an embodiment, there are 81 distinct combinations of model tuning parameter values. Thus, 81 CF scores (one for each model tuning parameter value combination) may be fed in parallel into the machine learning engine 102.

As with the decay factor example given above, the weight that is given to each of the CF scores in generating the ML score is based, at least in part, on the other inputs received by machine learning engine 102. As indicated in FIG. 3, those other inputs include the raw CF features 120, the raw CBF features 126, the CBF score 130 and any number of other inputs 112.

Flexible Objective Functions

When used in the context of video-to-video recommendations, machine learning engine 102 generates ML scores that predict the probability that a user will watch video B (the target video) given he/she already watched video A (the compared video). In practice, there are multiple goals publishers want to optimize achieve. Examples of goals include, but are not limited to:

Increase the total movie watch time
Increase the number of videos each user watches
Increase the total minutes a user spends on watching each (recommended) video
Increase the ad revenue from each video watch
Increase the reach
Increase the revenue per movie To address this challenge, embodiments are provided in which predictions are initially reflected in several distinct sub components. The components may include, for example:

P(B|A)—the probability that a user would enjoy watching B given he/she watched A
R(B)—the expected revenue from each watch of B (* future work)
P(ad|u, B)—the probability that user u watching B will click on ad After generating scores each of these components using a machine learning engine, the component scores may then be combined, based on a particular set of goals, to produce the composite ML score that is used as the basis for selecting which candidate videos to recommend.

Figure 4:
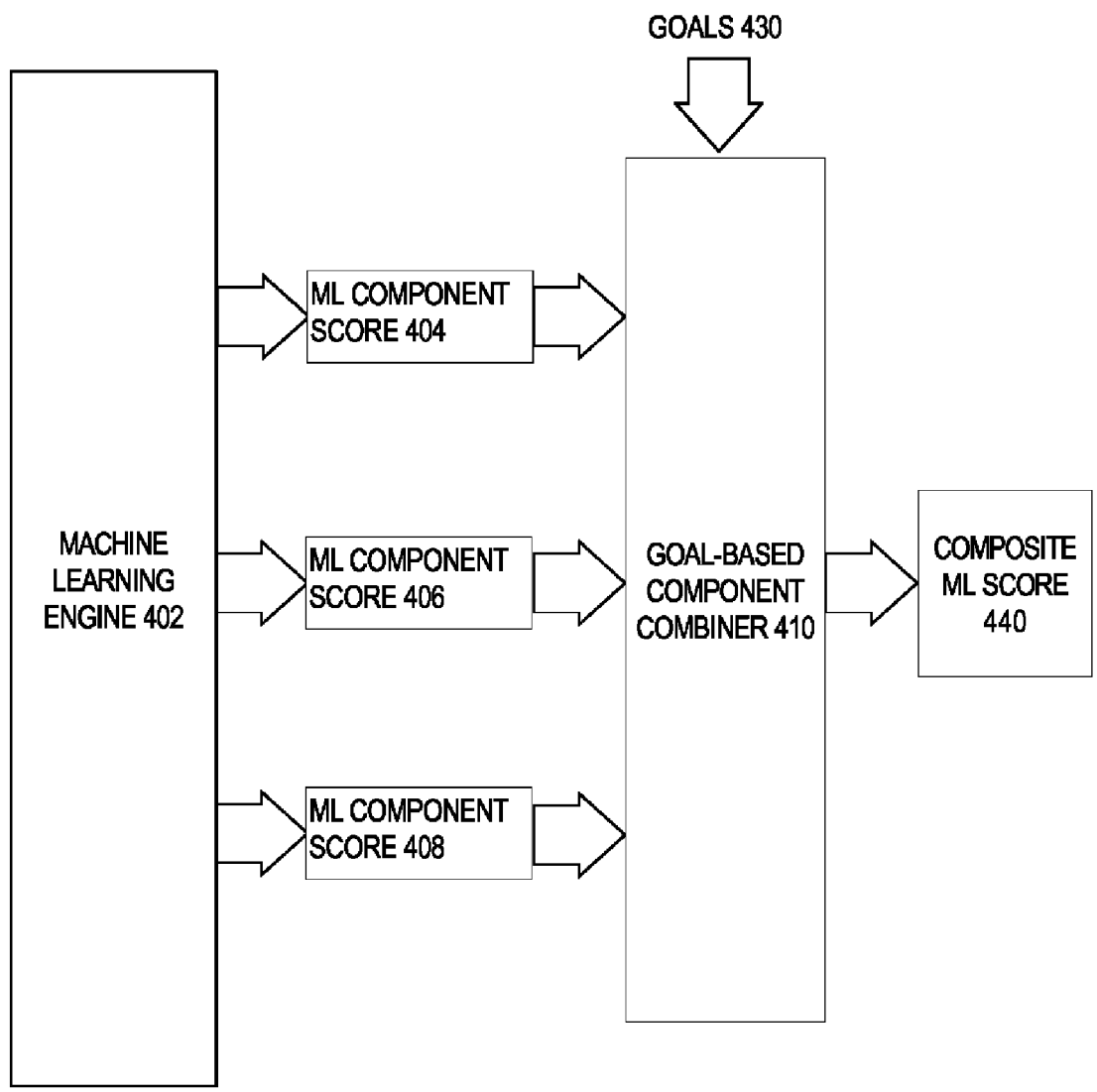
FIG. 4 is a block diagram that illustrates generating multiple distinct score components, and combining the component scores based on goals, according to an embodiment of the invention.

FIG. 4 is a block diagram of a machine learning engine 402 that has been trained to generate ML component scores 404, 406 and 408 that are combined by a goal-based component combiner 410 to produce a composite ML score 440 based on specified goals 430. In this example, ML component scores 404, 406 and 408 may correspond to the objective functions P(B|A), R(B), and P(ad|u, B), described above. The weight that each of the component scores is given by goal-based component combiner 410 when generating the composite ML score 440 is based on the goal information 430 fed to the goal-based component combiner 410.

For example, assume that goals 430 indicate that user engagement is significantly more important than revenue, and that revenue is slightly more important than advertising. Based on such goal information 430, goal-based combiner 410 may weight component scores 404, 406 and 408 by 0.6, 0.25 and 0.15, respectively.

While machine learning engine 402 is illustrated as a single engine, machine learning engine 402 may be implemented as three distinct engines, each of which is trained to generate a different ML component score. The actual number of component scores, and how goal-based component combiner 410 assigns weights to those scores when generating the composite ML score 440, may vary from implementation to implementation. For example, a single recommendation system may generate dozens of ML component scores, each of which reflects a prediction based on a different objective function. Goal-based component combiner 410 may combine those ML component scores in a variety of ways based on the goal information 430.

In one embodiment, the goal-based component combiner 410 is fed multiple sets of goals, and therefore generates multiple composite ML scores. In such an embodiment, each video pair combination would have multiple composite ML scores, and the actual ML score used to determine whether to recommend a video would be based on the goals that are in effect at the time a recommendation is to be given.

Alternating Between Component Scores

To give recommendations that satisfy a certain set of goals, component scores may be combined into a composite ML score 440 that is used as the basis for determining which candidate videos to recommend. In an alternative embodiment, a composite ML score 440 is not generated. Instead, when giving recommendations, the recommendation system alternates between which of the component scores to use as the basis for determining a video to recommend.

For example, instead of generating a composite ML score 440 by giving ML component scores 404, 406 and 408 the weights of 0.6, 0.25 and 0.15, respectively, the recommendation system may give recommendations based on ML component score 404 60% of the time, based on ML component score 406 25% of the time, and component score 408 15% of the time. As with embodiments that generate a composite ML score 440, embodiments that alternate between ML component scores do so based on the goals that are in effect at the time a recommendation is being given.

According to one embodiment, the pattern of alternating between the ML component scores need not be uniform. For example, a recommendation system may perform alternation on a user-centric basis, where a user is initially provided recommendations based on an ML component score that predicts user engagement. Only after the user has been presented with several recommendations that focus on user engagement, the recommendation system may begin providing some recommendations based on other objective functions, such as revenue maximization. If a user's behavior when presented with revenue maximizing recommendations indicates that user engagement has fallen below a particular threshold, the recommendation system may switch back to providing recommendations that are primarily or exclusively based on component scores that relate to user engagement.

Constrained Exploration

According to one embodiment, user behavior is captured as videos are recommended to users, and that user behavior is used to update the metadata used by the recommendation system, as described above. However, as long as users are always presented with the "optimal" video recommendations (e.g. the videos with the highest ML scores), no behavior data will be gathered about how users would have reacted to "non-optimal" recommendations. Without gathering information about user reaction to non-optimal recommendations, the recommendation system will have difficulty correcting itself when videos that were not recommended should have been recommended.

For example, assume that a video A would be of great interest to viewers of video B. However, in the absence of any viewing history for video A, the machine learning engine 102 generated a low ML score for the video pair A and B. Due to the low ML score, video A would not be recommended to viewers of video B, so few viewers of video B would what video A. Consequently, the ML score for the video pair A and B would remain low.

To avoid such problems, behavior data may be collected for non-optimal recommendations by periodically presenting non-optimal recommendations to users. Presenting a non-optimal recommendation is referred to as "exploring", because it presents the user with a recommendation that is outside the set of videos that the user would normally be presented. However, too much exploration, or exploration under the wrong circumstances, may degrade the user experience to an unacceptable degree.

Therefore, according to one embodiment, the recommendation system puts constraints on exploration. Specifically, exploration is performed in a manner that constrains the negative impact the exploration has on the video recommendation goals. For example, the recommendation system may periodically randomize the selection of videos to recommend to a user. However, the random selection may be constrained by excluding from the pool from which the random selection is made any videos whose negative impact is predicted to be above a certain threshold.

For example, during exploration, the pool of videos from which a random selection is made may include only videos that have, relative to the compared video, a CF score above some threshold X, or a CBF score above some threshold Y, or an MF score above some threshold Z. The specific constraint rules place on the selection pool of videos may be arbitrarily complex. For example, a video may qualify for the selection pool if ((the CF score for any decay factor >X) or (any one of the ML component scores >Y) and (the composite ML score >Z)).

According to one embodiment, multi-armed bandit techniques are used by the video recommendation to learn the effect that each variable in the exploration selection process has on the achievement of the current goals, and the variables that are predicted to have the least negative impact are adjusted. For example, with the epsilon-greedy strategy, the videos recommended by the ML system (best lever) is selected for a proportion 1-$\epsilon$ of the trials, and videos that belong to other pools (random, trending, CBF score above certain threshold) are selected (with uniform probability) for a proportion $\epsilon$. A typical parameter value might be $\epsilon$=0.1, but this can vary widely depending on circumstances and predilections.

Run-Time Performance Enhancements

Various run-time performance enhancements may when providing video recommendations using the techniques described herein. For example, some embodiments may use a bloomfilter when joining the user click data (very small) with the features (relatively huge) to generate training input to the machine learning system. Specifically, in one embodiment, a bloomfilter is built using the user click data, and the filter is used to filter out all irrelevant CF and CBF features that do not have click data associated with them. This is particular useful for data processing systems such as hadoop, where no indices were built for the various tables.

Another run-time enhancement that may be used by the video recommendation system involves an asymmetric join. Specifically, when joining the CBF features and CF features, an asymmetric join may be used to take advantage of the fact that there is limited behavior data for new content. In one embodiment, the features are organized in different buckets depending the time they were generated. The recommendation system only joins CBF features with CF features that were generated in the last few hours. This significantly cuts down time needed to generate training and test data for the machine learning system.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
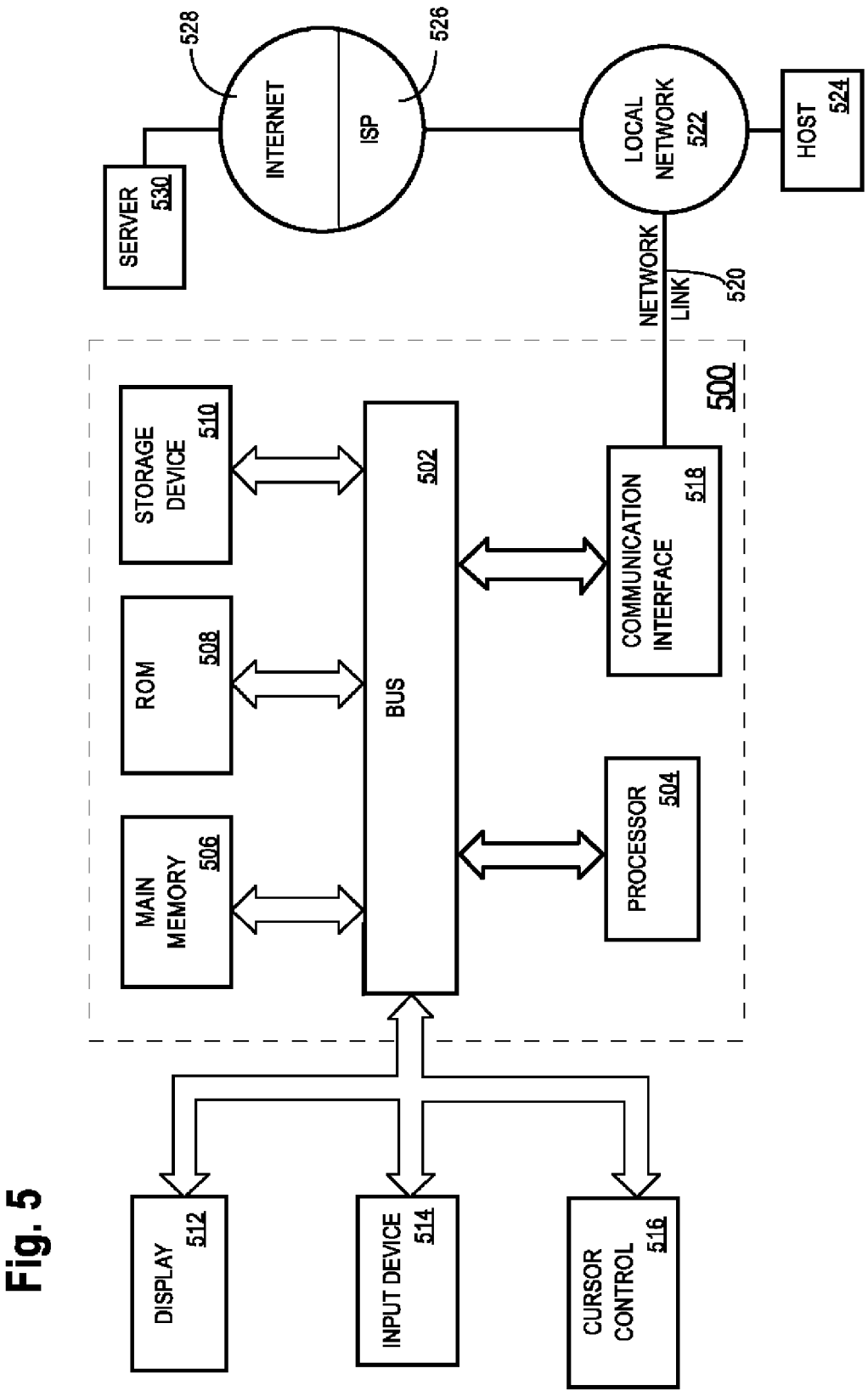
FIG. 5 is a block diagram of a computer system that may be used to implement a video recommendation system, according to an embodiment of the invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating a plurality of machine-learning (ML) scores by feeding an input feed to a machine learning engine for each video in a set of candidate videos;
wherein the input feed for a particular video in the set of candidate videos includes at least:
one or more raw collaborative filtering features;
a collaborative filtering score that was generated based on the one or more raw collaborative filtering features;
one or more raw content-based filtering features; and
a content-based filtering score that was generated based on the one or more raw content-based filtering features;
when generating the ML score for the particular video, the machine learning engine determining weights to give the collaborative filtering score and the content-based filtering score based, at least in part, on the one or more raw collaborative filtering features and the one or more raw content-based filtering features;
selecting one or more videos, from the set of candidate videos, to recommend to a particular user based, at least in part, on the ML scores;
wherein the method is performed by one or more computing devices.

2. The method of claim 1 wherein:
the input feed for the particular video includes video-pair-centric metrics for a video pair that includes the particular video and a compared video;
the one or more raw collaborative filtering features include collaborative filtering metrics for the video pair; and
the one or more raw content-based filtering features include content-based filtering metrics for the video pair.

3. The method of claim 2 wherein the collaborative filtering metrics of the video pair are only updated in response to detecting a new indication of user interest with one or more of the videos in the video pair.

4. The method of claim 2 wherein the content-based filtering metrics of the video pair are only updated in response to detecting a new change in video metadata for one or more of the videos in the video pair.

5. The method of claim 2 wherein:
the video-pair-centric metrics of the video pair includes a particular set of metrics; and
the particular set of metrics is maintained for the video pair if and only if the video pair satisfies a particular pairing test.

6. The method of claim 5 wherein the particular set of metrics includes all of the video-pair-centric metrics.

7. The method of claim 5 wherein the particular set of metrics includes only one of:
the collaborative filtering metrics for the video pair; and
the content-based filtering metrics for the video pair.

8. The method of claim 7 further comprising using a second pairing test, that is different than the pair test, to determine whether to maintain, for the video pair, the other of:
the collaborative filtering metrics for the video pair; and
the content-based filtering metrics for the video pair.

9. The method of claim 1 wherein:
the input feed for the particular video includes a plurality of collaborative filtering scores; and
each collaborative filtering score of the plurality of collaborative filtering scores is based on the same raw collaborative filtering features, but a different decay factor, as each other of the plurality of collaborative filtering scores.

10. The method of claim 1 wherein:
the ML score generated for the particular video is one of a plurality of component scores generated by the machine learning engine for the particular video; and
the method further comprises combining plurality of component scores, based on goal information, to produce a composite ML score for the particular video.

11. The method of claim 1 wherein:
the ML score generated for the particular video is one of a plurality of component scores generated by the machine learning engine for the particular video; and
the method further comprises alternating which component scores, of the plurality of component scores, are used as the basis for selecting which videos to recommend to the particular user.

12. A method comprising:
generating a plurality of machine-learning (ML) scores by feeding a corresponding input feed to a machine learning engine for each video in a set of candidate videos;
wherein the input feed that corresponds to a particular video in the set of candidate videos includes a plurality of parameter values;
selecting one or more videos, from the set of candidate videos, to recommend to a particular user based, at least in part, on the ML scores;
wherein the one or more videos selected for recommendation to the particular user includes the particular video;
for the particular video, determining a recommendation reason, from a plurality of possible recommendation reasons, based on how the machine learning engine weighted the plurality of parameter values when generating the ML score for the particular video;
causing an indication of the recommendation reason to be presented to the particular user, in association with a recommendation of the particular video;
wherein the method is performed by one or more computing devices.

13. A method comprising:
generating a plurality of machine-learning (ML) scores by feeding a corresponding input feed to a machine learning engine for each video in a set of candidate videos;
wherein the input feed that corresponds to a particular video in the set of candidate videos includes a plurality of parameter values;
wherein the plurality of parameter values includes a first set of parameter values and a second set of parameter values;
wherein the first set of parameter values are generated based on a model that employs a particular model tuning parameter;
wherein the first set of parameter values includes, for each model tuning parameter value of a plurality of model tuning parameter values for the particular model tuning parameter, at least one parameter value that is based on the model tuning parameter value;
wherein the second set of parameter values includes one or more parameter values that are independent of the model tuning parameter;
wherein, when generating the ML score for the particular video, the machine learning engine determines how much weight to give to each parameter value in the first set of parameter values based, at least in part, on the parameter values in the second set of parameter values; and
selecting one or more videos, from the set of candidate videos, to recommend to a particular user based, at least in part, on the ML scores;
wherein the method is performed by one or more computing devices.

14. The method of claim 13 wherein the particular model tuning parameter is a decay factor used by the model.

15. The method of claim 13 wherein the particular model tuning parameter is an odds-ratio cut off used by the model.

16. The method of claim 13 wherein the particular model tuning parameter is a normalization factor used by the model.

17. The method of claim 13 wherein:
the model uses a plurality of model tuning parameters; and
each parameter value in the first set of parameter values is based on a distinct combination of model tuning parameter values for the plurality of model tuning parameters.

18. The method of claim 1 further comprising:

building a bloomfilter based on behavior data that indicates videos with which users have recently interacted; and generating training input for the machine learning system by using the bloomfilter to filter out collaborative filtering features and content-based filtering features that do not relate to the videos with which users have recently interacted.

19. The method of claim 1 further comprising performing an asymmetric join of the content-based filtering features with the collaborative filtering features such that content-based filtering features are only joined with collaborative filtering features that were generated within a threshold period of time.

20. The method of claim 1 further comprising performing constrained exploration by organizing candidate videos into pools based, at least in part, on the ML scores, and selecting videos to recommend from the pools using a multi-armed bandit technique.

21. The method of claim 20 wherein the multi-armed bandit technique involves an epsilon-greedy strategy.

22. One or more non-transitory computer-readable media storing instructions which, when executed by one or more processors, cause performance of the method recited in claim 1.

23. One or more non-transitory computer-readable media storing instructions which, when executed by one or more processors, cause performance of the method recited in claim 12.

24. One or more non-transitory computer-readable media storing instructions which, when executed by one or more processors, cause performance of the method recited in claim 13.

* * * * *